United States Patent [19]

Root

[11] 3,835,218

[45] Sept. 10, 1974

[54] CATALYTIC DECOMPOSITION OF AMMONIUM BISULFATE TO FORM AMMONIUM AND SULFUR DIOXIDE BISULFITE

[75] Inventor: Charles B. Root, Morristown, N.J.

[73] Assignee: Allied Chemical Corporation, New York, N.Y.

[22] Filed: Aug. 12, 1971

[21] Appl. No.: 176,388

[52] U.S. Cl................................. 423/519, 423/451
[51] Int. Cl.......................... C01b 17/50, C01c 1/22
[58] Field of Search............... 23/131, 177 R, 177 S; 423/541, 539, 519, 356

[56] References Cited
UNITED STATES PATENTS 2,927,001  3/1960  McCullough..................... 23/177 R
3,282,646  11/1966  Boufield et al..................... 23/177 R

FOREIGN PATENTS OR APPLICATIONS 1,104,562  2/1968  Great Britain..................... 23/177 R

OTHER PUBLICATIONS

Handbook of Chemistry and Physics, 51st. Edition, The Chemical Rubber Company, Cleveland, Ohio, 1970, page B-3

Primary Examiner—Earl C. Thomas
Attorney, Agent, or Firm—Ernest D. Buff; Arthur J. Plantamura

[57]  ABSTRACT

A process for recovering ammonium bisulfite and sulfur dioxide from ammonium bisulfate by heating in the presence of specific catalysts.

6 Claims, No Drawings

CATALYTIC DECOMPOSITION OF AMMONIUM BISULFATE TO FORM AMMONIUM AND SULFUR DIOXIDE BISULFITE

This invention relates to the decomposition of ammonium bisulfate to recover the sulfur values therefrom. More particularly, this invention relates to a process for forming ammonium bisulfite and sulfur dioxide from ammonium bisulfate.

BACKGROUND OF THE INVENTION

Ammonium sulfate is produced as a major by-product from the production of caprolactam. This by-product has been used previously as a fertilizer, but recently an oversupply has made its production uneconomical. Accordingly, means of recovering and recycling the sulfur values in the ammonium sulfate, formerly a loss to the caprolactam process, has been sought, to thereby reduce the overall cost of producing caprolactam.

Ammonium sulfate is readily decomposed on heating to form ammonia and ammonium bisulfate, as is disclosed, for example, in U.S. Pat. No. 3,282,646. Ammonium bisulfate can be pyrolized at about 400° – 500°C. forming ammonia, sulfur trioxide, and water. However, this process is inefficient because ammonium sulfate also reforms under these conditions. Further, the products are not the most efficient for recycle to the caprolactam process.

SUMMARY OF THE INVENTION

It is an object of the present invention to recover sulfur and ammonia values by decomposition of ammonium bisulfate.

It is another object to provide a process for the production of ammonium bisulfite and sulfur dioxide from ammonium bisulfate.

It is a further object to recover ammonium bisulfite and sulfur dioxide from ammonium bisulfate by-products of the process for preparing caprolactam which can be recycled to the caprolactam process.

Further objects will become apparent from the following detailed description thereof.

We have discovered that ammonium bisulfate can be heated in the presence of certain catalysts at temperatures over 140°C. to form ammonium bisulfite, nitrogen, water, and sulfur dioxide. These products cannot recombine under the present process conditions to form ammonium sulfate.

DETAILED DESCRIPTION OF THE INVENTION

It is believed that a series of reactions occur during the heating step which can be summarized by the following equations:

1. $3NH_4HSO_4 \rightarrow 3NH_3 + 3H_2O + 3SO_3$
2. $3SO_3 + 2NH_3 \rightarrow N_2 + 3SO_2 + 3H_2O$
3. $H_2O + SO_2 + NH_3 \rightarrow NH_4HSO_3$ or, overall,
4. $3NH_4HSO_4 \rightarrow N_2\uparrow + 5H_2O + 2SO_2\uparrow + NH_4HSO_3$ The catalysts suitable in the present invention include transition metal salts, including their sulfates, chlorides, and oxides, which are soluble in molten ammonium bisulfate. Illustrative of suitable catalysts are copper sulfate, iron oxide, cobalt oxide, chromium trioxide, cupric oxide, cupric chloride, manganese oxide, nickel sulfate, and chromium sulfate. The catalyst can be present in amounts ranging from about 1 to 10 percent by weight of the starting material, preferably 1 to 5 percent by weight.

The ammonium bisulfate and catalyst are heated to a temperature of about 140°C., preferably about 350° up to about 450°C. When the catalyst has dissolved in the molten ammonium bisulfate, the vaporized products are collected. The ammonium bisulfate and water are condensed in a liquid trap and the nitrogen and sulfur dioxide can be recovered from the exit gases. The sulfur dioxide can be separated from other exit gases if desired, as by cooling.

In a preferred embodiment, an inert gas is passed through the molten ammonium bisulfate/catalyst solution to aid in removing the gaseous products, thereby increasing the rate of decomposition. Suitable inert gases include for example, nitrogen, helium, and the like.

As will be apparent to one skilled in the art, the present process is adaptable to batch, semi-batch and continuous type operations.

The products of the present process can be conveniently recycled directly to the caprolactam plant, preserving the sulfur values and reducing the costs of preparing caprolactam. Caprolactam is prepared in a series of steps whereby cyclohexanone is reacted with hydroxylamine sulfate and ammonia to form cyclohexanone oxime. The latter undergoes the Beckmann rearrangement in the presence of oleum to form caprolactam.

Hydroxylamine can be prepared by reacting ammonium nitrite and ammonium bisulfite to form hydroxylamine disulfonate, which hydrolyzes in water to form the stable sulfate salt of hydroxylamine. Thus, the ammonium bisulfite produced by the present process can be recycled directly to the hydroxylamine forming step.

The sulfur dioxide produced by the present process can be employed in the preparation of oleum, required for the Beckmann rearrangement. The sulfur dioxide is oxidized to sulfur trioxide and added to sulfuric acid to form oleum.

Thus, the present process provides an economic way to preserve the sulfur values of the ammonium sulfate by-product for recycle in the preparation of caprolactam.

The invention will be further illustrated by the following examples, but it is meant to be understood that the invention is not to be limited to the details described therein. In the examples all parts are by weight.

EXAMPLE 1

Twenty parts of ammonium bisulfate and one part of cupric sulfate ($CuSO_4 \cdot 5H_2O$) were charged to a tubular decomposition vessel fitted with a frit, a gas inlet, furnace, temperature indicators and gas outlet and heated to 450°C. A helium flow was passed through the frit to aid in carrying off the products of reaction. The gas outlet was fitted with a condenser and connected to a liquid trap and an exit gas trap.

Ammonium bisulfite and water collected in the liquid trap. The gaseous products were identified as 29 percent nitrogen and 71 percent sulfur dioxide by vapor phase chromatographic analysis.

EXAMPLE 2

The procedure of Example 1 is repeated substituting cupric chloride as catalyst. Similar results are obtained.

EXAMPLE 3

The procedure of Example 1 is repeated except at 375°C. Similar results are obtained.

EXAMPLE 4

The procedure of Example 1 is repeated substituting chromium oxide as catalyst. Similar results are obtained.

I claim:

1. A process for decomposing ammonium bisulfate which comprises heating said ammonium bisulfate at temperatures of about 140° to about 450°C. in the presence of a catalyst selected from the group consisting of sulfates, chlorides and oxides of metals selected from the group consisting of copper, iron, cobalt chromium, manganese and nickel, and recovering ammonium bisulfite and sulfur dioxide.

2. A process according to claim 1 wherein the temperature is about 350° – 450°C.

3. A process according to claim 1 wherein the metal is copper.

4. A process according to claim 1 wherein said catalyst is present in an amount ranging from about 1 to 10 percent by weight of the ammonium bisulfate.

5. A process according to claim 1 wherein an inert gas flow is maintained through the ammonium bisulfate.

6. A process for decomposing ammonium bisulfate which comprises heating said ammonium bisulfate at temperatures of about 350° – 450°C. in the presence of a catalyst selected from the group consisting of sulfates, chlorides, and oxides of metals selected from the group consisting of cooper, iron, cobalt, chromium, manganese and nickel, while maintaining an inert gas flow through the ammonium bisulfate, and recovering ammonium bisulfite and sulfur dioxide.

* * * * *